A. T. WOODSIDE.
EGG POACHER.
APPLICATION FILED APR. 14, 1908.
919,277.
Patented Apr. 20, 1909.
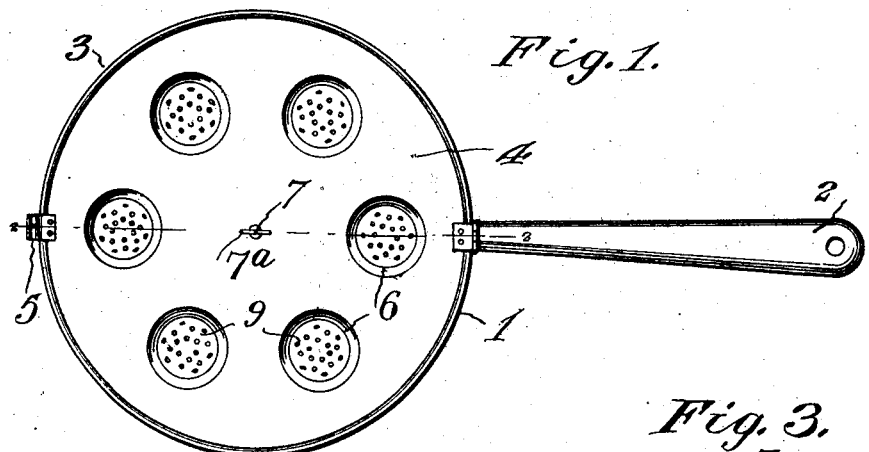
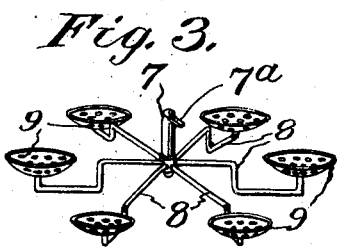
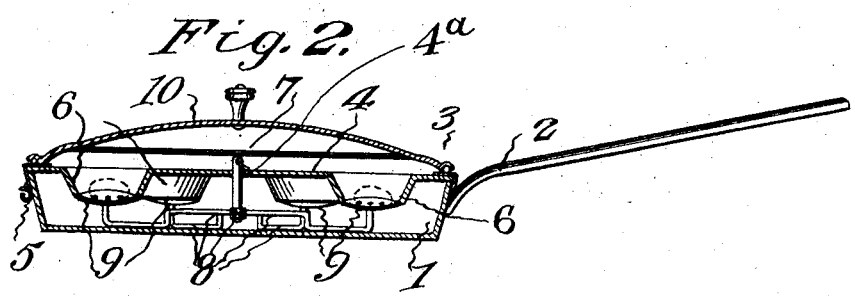
Inventor,
Arthur T. Woodside.
By Victor J. Evans
Attorney
Witnesses:

UNITED STATES PATENT OFFICE.

ARTHUR T. WOODSIDE, OF CHILLICOTHE, OHIO.

EGG-POACHER.

No. 919,277.  Specification of Letters Patent.  Patented April 20, 1909.

Application filed April 14, 1908. Serial No. 427,039.

*To all whom it may concern:*

Be it known that I, ARTHUR T. WOODSIDE, a citizen of the United States, residing at Chillicothe, in the county of Ross and State of Ohio, have invented new and useful Improvements in Egg-Poachers, of which the following is a specification.

This invention relates to devices for cooking eggs, and the object of the invention is to provide an ordinary frying pan with a device whereby eggs may be readily and quickly cooked without danger of the operator contacting with the hot egg when it is desired to remove the egg from the pan.

Another object of the invention is to provide a device of this character primarily intended for poaching eggs, which is so constructed and arranged that a plurality of eggs may be poached at a single operation, and the poached eggs elevated from the water and brought into a position whereby they may be readily and quickly removed from the device.

With these and other objects in view the invention resides in the novel construction of elements and their arrangement in operative combination, hereinafter fully described and claimed.

In the accompanying drawings, Figure 1 is a top plan view of a device constructed in accordance with the present invention. Fig. 2 is a longitudinal sectional view upon the line 2—2 of Fig. 1. Fig. 3 is a detail perspective view of the spider containing the perforated egg receiving cups.

In the accompanying drawings the numeral 1 designates a frying pan of the ordinary construction. This pan 1 is provided with the usual handle 2, by which it is manipulated and is adapted for the reception of the improved egg poaching device 3. This device 3 comprises a plate 4, adapted to be positioned upon the top edges of the pan, and to be secured thereto by the latches 5. This plate 4 is provided with a plurality of cylindrical openings, each of which are provided with depending walls 6, so as to produce a plurality of collars or sleeves. The plate 4 is provided with a central orifice 4ª adapted for the reception of a central post 7. This post 7 is adapted to have its upper end projected above the surface of the plate 4 and its lower end extended within the pan 1. The upper extending portion of the post 7 is provided with a suitable loop or handle 7ª, and its lower end is adapted for the reception of a plurality of arms 8. These arms 8 radiate from the post 7 and have their free ends bent upwardly to provide for the reception of a plurality of perforated disk shaped members 9. These members 9 are adapted to be positioned within the sleeves 6 provided by the annular openings of the plate 4. The radiating arms 8 may be provided with suitable offsets, as illustrated in Figs. 2 and 3 of the drawings so as to provide for only a small bearing surface of the arms in contacting the bottom of the pan.

The plate 4 is provided with a suitable cover 10 by which the steam generated by the water within the pan 1 is retained within the device to assist in the operation of poaching or cooking the eggs.

From the above description, taken in connection with the accompanying drawings, it will be apparent that after a sufficient quantity of water has been placed in the pan 1, and the eggs to be cooked positioned within the sleeves 6 and upon the disk shaped bottoms for the sleeves provided by the arms or spiders connected with the post 7, that when the process of cooking has been completed, the post 7 may be readily elevated carrying with it the perforated disks 9 and the cooked eggs elevated to a position above the surface of the water and their ready removal provided for. It will be also seen that by providing the members 9 in the form of disks, the eggs when cooked and elevated to the surface of the plate 4 will be effectively retained upon the members 9 without danger of rolling upon or contacting with the plate 4.

Having thus fully described the invention what is claimed as new is:

The combination with a vessel, a plate provided with a hinged cover, the plate being provided with a central orifice and a plurality of openings having cone shaped depending sleeves, disk shaped perforated members normally engaging with the lower edge of the depending sleeves, arms secured to the members, said arms being provided with offset portions adapted to lie upon the base of the vessel and out of the path of the depending sleeves and being connected with a central member, and said central member projecting through the central orifice of the plate and provided with a handle whereby the member and disk shaped members within the sleeves may be drawn upwardly.

In testimony whereof I affix my signature in presence of two witnesses.

ARTHUR T. WOODSIDE.

Witnesses:
JOHN SHEETS,
ELIJAH CUTRIGHT, Jr.